(12) United States Patent
Smith

(10) Patent No.: US 11,965,113 B2
(45) Date of Patent: Apr. 23, 2024

(54) POLYCARBONATE BASED COMPOSITE COATINGS

(71) Applicant: American Polymers Corporation, Santa Fe Springs, CA (US)

(72) Inventor: Stuart Bruce Smith, Santa Fe Springs, CA (US)

(73) Assignee: AMERICAN POLYMERS CORPORATION, Santa Fe Springs, CA (US)

( * ) Notice: Subject to any disclaimer, the term of this patent is extended or adjusted under 35 U.S.C. 154(b) by 101 days.

(21) Appl. No.: 17/579,934

(22) Filed: Jan. 20, 2022

(65) Prior Publication Data

US 2023/0227663 A1 Jul. 20, 2023

(51) Int. Cl.
| | |
|---|---|
| *C09D 5/28* | (2006.01) |
| *C09D 5/02* | (2006.01) |
| *C09D 7/40* | (2018.01) |
| *C09D 7/61* | (2018.01) |
| *C09D 7/63* | (2018.01) |
| *C09D 133/14* | (2006.01) |
| *C09D 187/00* | (2006.01) |

(52) U.S. Cl.
CPC ............... *C09D 5/028* (2013.01); *C09D 7/61* (2018.01); *C09D 7/63* (2018.01); *C09D 7/67* (2018.01); *C09D 133/14* (2013.01); *C09D 187/005* (2013.01)

(58) Field of Classification Search
CPC ......... C08L 83/04; C08L 83/10; C08G 77/06; C08G 18/61; C08K 5/17
See application file for complete search history.

(56) References Cited

U.S. PATENT DOCUMENTS

| | | | |
|---|---|---|---|
| 5,240,979 A | 8/1993 | Maier et al. | |
| 9,482,492 B2 | 11/2016 | Smith | |
| 9,714,363 B2 | 7/2017 | Smith | |
| 2004/0197572 A1 | 10/2004 | Bell | |
| 2013/0222496 A1* | 8/2013 | Lu | B41J 2/2114 524/386 |
| 2016/0229947 A1 | 8/2016 | Smith | |
| 2016/0264709 A1 | 9/2016 | Smith | |
| 2017/0253751 A1 | 9/2017 | Busbee et al. | |
| 2021/0108100 A1* | 4/2021 | Nishimura | C09D 11/10 |

FOREIGN PATENT DOCUMENTS

EP 3533835 9/2019

OTHER PUBLICATIONS

Covestro ("Water-borne polyurethane coatings with outstanding resistance to disinfectant", 2020). (Year: 2020).*
Alberdingk Boley, Inc .; Technical Data Sheet AlberdingkUSA U 915; Jan. 5, 2011; 2 pages; Greensboro, NC.
Matos, Taina; PCT International Search Report and Written Opinion of International Searching Authority; Jul. 3. 2023; pp. 1-15; Alexandria, VA.
Gu, Xiaohong, et al.; Studying Long-term Performance of a Nano-ZnO filled Waterborne Polyurethane Coating using Spectroscopies and Microscopies; NIST National Institute of Standards and Technology U.S. Department of Commerce; Sep. 9, 2009; 1-5 pages; Gaithersburg, MD.

* cited by examiner

*Primary Examiner* — Robert S Jones, Jr.
*Assistant Examiner* — Jiangtian Xu
(74) *Attorney, Agent, or Firm* — STETINA BRUNDA GARRED & BRUCKER

(57) ABSTRACT

Two-component polycarbonate-based composite products are contemplated in which the composite is formed as the cured reaction product of a polycarbonate polyurethane dispersed within an aqueous colloid along with a coalescent agent, a secondary polymer additive dispersed within the aqueous colloid, and a secondary polymer crosslinker. The aqueous colloidal dispersion may be applied as a coating to a surface that is intended to be coated and subsequently permitted to react and dry, resulting in the formation of a coating at the location at which it is applied. The composite product may be further formulated with additional constituents to be optically clear, glossy, and/or pigmented.

8 Claims, No Drawings

POLYCARBONATE BASED COMPOSITE COATINGS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to the field of polycarbonate coatings and composites, and methods of making the same. More particularly, the present disclosure relates to the incorporation of polycarbonate composite blends into two-part coatings and composites.

2. Related Art

Polyurethanes are a class of polymers composed of organic monomers joined by carbamate (urethane) links. Polyurethanes are typically formed via the reaction of an isocyanate and a polyol. Because polyurethanes may be produced based upon a wide variety of monomeric or polymeric starting materials, they display substantial chemical variety and very distinct physical properties, resulting in a wide range of potential applications.

Among other things, polyurethanes are used conventionally to make flexible and rigid foams, aerosolids and other sealants typically used as insulation materials, flexible plastics, hard plastics, adhesives, varnishes, and coatings.

Conventional polyurethane coatings can suffer from a number of deficiencies and undesirable characteristics. For example, they may have poor adhesion characteristics to certain surface, and may not adhere sufficiently well to a wide range of surfaces which include concrete, wood, asphalt, and vinyl, among others. They may have poor resistance to physical abrasion, chemical attack, or the effect of UV radiation, high or low temperatures, or temperature changes in climates or application where substantial temperature changes are expected. They may not have sufficient color stability, especially in view of these disparate conditions described above. Their abrasion resistance characteristics may also be degraded under the above discussed disparate conditions. Further, may also display insufficient or may lose their flexibility over time, and may become brittle and crack or otherwise fail when used in applications where some movement of the underlying surface is expected. Such conventional polyurethane coatings may also have undesirable odors or may otherwise be unsafe for use in certain environments.

Therefore, there is a need for polyurethane coatings and other composite products that overcome these deficiencies.

BRIEF SUMMARY

To solve these and other problems, various polycarbonate-based composite products are contemplated in which the composite is formed as the cured reaction product of a polycarbonate composite blend comprising a polycarbonate copolymerized with an aromatic or aliphatic polyurethane dispersed within an aqueous colloid along with a coalescent agent, a secondary polymer additive dispersed within the aqueous colloid, and a secondary polymer crosslinker. The aqueous colloidal dispersion may be applied to the surface that is intended to be coated and subsequently permitted to react and dry, resulting in the formation of the coating at the location at which it is applied. The composite may be produced in the form of a coating, and may be further formulated with additional constituents to be optically clear, glossy, and/or pigmented.

According to a first exemplary embodiment, a composite coating is contemplated as comprising the cured reaction product of an aqueous colloidal dispersion of a polycarbonate composite blend comprising a polycarbonate copolymerized with an aromatic or aliphatic polyurethane, a self-crosslinking hydroxyfunctional polyacrylate, a coalescent agent, and metal oxide particles having a mean particle size across all dimensions ranging from 1 to 100 nm. In this first exemplary embodiment, in the aqueous colloidal dispersion, the polycarbonate composite blend may comprise an aliphatic poly(carbonate-ester) polyurethane, and may be provided in an amount from about 10% to about 90% of the non-volatile content of the aqueous colloidal dispersion. In this first exemplary embodiment, the self-crosslinking hydroxyfunctional polyacrylate may be provided in an amount up to about 75% of the non-volatile content of the aqueous colloidal dispersion.

In this first exemplary embodiment, the coalescent agent may comprise N-methyl-2-pyrrolidone, and may be provided in the aqueous colloidal dispersion in an amount from about 2% to about 10% by volume. Further, in the first exemplary embodiment, the metal oxide particles may be provided in an amount from about 0.05 to about 5% of the non-volatile content of the aqueous colloidal dispersion. The metal oxide particles may comprise zinc oxide, and the aqueous colloidal dispersion may also further comprise a pigment in an amount from about 1% to about 20% of the non-volatile content.

According to a second exemplary embodiment, a composite is contemplated as comprising the cured reaction product of an aqueous colloidal dispersion of a polycarbonate composite blend comprising polycarbonate copolymerized with an aromatic or aliphatic polyurethane, an alkoxy-functional polysiloxane resin, a coalescent agent, an a carbodiimide. In this second exemplary embodiment, in the aqueous colloidal dispersion, the polycarbonate composite blend may comprise an aliphatic poly(carbonate-ester) polyurethane, and may be provided in an amount from about 10% to about 90% of the non-volatile content of the aqueous colloidal dispersion. The alkoxy-functional polysiloxane resin may be provided in an amount up to about 35% of the non-volatile content of the aqueous colloidal dispersion.

In this second exemplary embodiment, the coalescent agent may comprise N-methyl-2-pyrrolidone, and may be provided in the aqueous colloidal dispersion in an amount from about 2% to about 10% by volume. Further, in the second exemplary embodiment, the carbodiimide may comprise a hydrophilically-modified polyfunctional polycarbodiimide. The aqueous colloidal dispersion may also further comprise a pigment in an amount from about 1% to about 20% of the non-volatile content.

According to a third exemplary embodiment, a composite product comprising the cured reaction product of an aqueous colloidal dispersion of a polycarbonate composite blend comprising polycarbonate copolymerized with an aromatic or aliphatic polyurethane, a urethane-acrylate hybrid polymer, a coalescent agent, and metal oxide particles having a mean particle size across all dimensions ranging from 1 to 100 nm is contemplated. In this third exemplary embodiment, in the aqueous colloidal dispersion, the polycarbonate composite blend may comprise an aliphatic poly(carbonate-ester) polyurethane, and may be provided in an amount from about 10% to about 90% of the non-volatile content of the aqueous colloidal dispersion. In this third exemplary embodiment, in the aqueous colloidal dispersion, the urethane-acrylate hybrid polymer may be provided in an amount up to 50% of the non-volatile content of the aqueous colloidal dispersion.

In this third exemplary embodiment, the coalescent agent may comprise N-methyl-2-pyrrolidone, and may be provided in the aqueous colloidal dispersion in an amount from about 2% to about 10% by volume. Further, in the first exemplary embodiment, the zinc oxide particles may be provided in an amount from about 0.05 to about 5% of the non-volatile content of the aqueous colloidal dispersion. The aqueous colloidal dispersion may also further comprise a pigment in an amount from about 1% to about 20% of the non-volatile content.

DETAILED DESCRIPTION

According to various aspects of the present disclosure, new types of composite products based on a polycarbonate composite blend combined with an additional polymer are contemplated in which the coating is formed as the cured reaction product of a polycarbonate composite blend dispersed within an aqueous colloid along with a coalescent agent, a secondary polymer additive dispersed within the aqueous colloid, and a secondary polymer crosslinker. The aqueous colloidal dispersion may be applied to the surface that is intended to be coated and subsequently permitted to react and dry, resulting in the formation of superior coatings at the location at which the aqueous colloidal dispersion is applied. The coatings may be further formulated with additional constituents to be optically clear, glossy, and/or pigmented.

A polycarbonate composite blend is a mixture of polycarbonates that are formed from polycarbonate polyols which have been copolymerized with other polymers, and typically display elastomeric properties. Generally, polycarbonate-based elastomers have weak intermolecular force, low Young's modulus, and high failure strain compared with other material, which results in significant elongation prior to breaking. According to each of the exemplary embodiments discussed herein, a polycarbonate composite blend is dispersed within an aqueous colloid alongside a coalescing agent alongside at least one secondary polymer additive and a secondary polymer crosslinker. As such, it may be seen that the polycarbonate composite blend may form a significant component of the resulting cured reaction product, which may in certain embodiments (though not necessarily all) represent the majority of the non-volatile content of the aqueous colloidal dispersion. As such, it may be seen that in many cases, the resulting cured reaction product formed via application and subsequent curing and drying of such aqueous colloidal dispersions may tend to reflect the elastomeric properties of the polycarbonate composite blend incorporated within, resulting in a composite which may significantly elongate without breaking. However, it may also be seen that depending on the identity and proportions of the polycarbonate composite blend, the coalescing agent, and/or other inclusions within the aqueous colloidal dispersion, the resulting coating may have significantly different material properties. According to the present disclosure, it is contemplated that the aqueous colloidal dispersion may include a mass of polycarbonate composite blend in a range from about 10% to about 90% of the non-volatile content of the aqueous colloidal dispersion. However, it may be seen that more or less polycarbonate composite blend may be present, without departing from the scope and spirit of the disclosure.

For example, but without limitation, it is contemplated that according to various exemplary embodiments, that the polycarbonate composite blend may be a mixture of self-crosslinking aliphatic poly(carbonate-ester) polyurethane copolymers having a predefined mean molecular weight. These mixtures of polycarbonates and polyurethanes may be made by known methods of synthesis, or obtained commercially from manufacturers such as Alberdingk Boley Inc., where a suitable mixture of polycarbonate composite blend is sold under the trade name AlberdinkUSA U 915, or from Covestro AG, where a suitable mixture of polycarbonate composite blend is sold under the trade name Bayhydrol U 2750.

Coalescent agents, also referred to as film formers, are used in dispersion paints and coatings for optimizing the coherence, mechanical properties, and appearance of polymeric agents within the aqueous colloidal dispersion, typically by reducing the minimum film formation temperature (MFFT) of the polymer within the aqueous colloidal dispersion. Coalescent agents typically do this via one or more effects, such as lowering the glass transition temperature of the polymer, reducing the polymer particle surface area, increasing the capillary forces by controlling the evaporation of water, and reducing the repulsive forces between polymer particles.

It is contemplated that in the herein disclosed aqueous colloidal distribution, any suitable coalescent agent may be utilized. However, according to certain exemplary embodiments, it may be preferred that N-methyl-2-pyrrolidone (NMP) be utilized as the coalescent agent. NMP is a powerful aprotic solvent which high solvency and low volatility which has high chemical and thermal stability, and is completely miscible with water at all temperatures, and may serve as a co-solvent with water. Further, NMP is recyclable and readily biodegradable. However, it may be seen that other coalescent agents may be used as alternatives to, or alongside NMP without departing from the scope and spirit of the present disclosure. According to the present disclosure, it is contemplated that the coalescent agent may be included within the within the aqueous colloidal dispersion in an amount of between 2 to 10% by volume. However, it may be seen that more or less more or less coalescent agent may be present, without departing from the scope and spirit of the disclosure.

For example, in alternative embodiments it is contemplated that dipropylene glycol n-butyl ether (DPnB) may be utilized as a suitable coalescent agent, which may be obtained via known methods of synthesis or obtained commercially from manufacturers such as Dow Chemical, where it is sold under the trade name Dowanol DPnB glycol ether. DPnB may be preferred as a coalescent agent for applications in which the coating is configured for application to certain surfaces. For example, while use of NMP may be preferred as a general coalescent agent for most or all types of surfaces, it may be seen that superior adhesion qualities and potentially other superior coating qualities may be realized by utilizing DPnB for applying coatings to metallic surfaces, such as steel or aluminum.

According to a first exemplary embodiment, a composite coating may be obtained as the cured reaction product of an aqueous colloidal dispersion including a polycarbonate composite blend, a coalescent agent, a self-crosslinking hydroxyfunctional polyacrylate and metal oxide particles having a mean particle size across all dimensions ranging from 1 to 100 nm. A more refined version of this exemplary embodiment, the metal oxide particles may comprise zinc oxide, also referred to as nano zinc. Nano zinc may be obtained commercially from manufacturers such as vendors such as CheMarCo, Inc. where a suitable aqueous formulation of nano zinc is sold under the trade name Oxylink.

Self-crosslinking hydroxyfunctional polyacrylates may comprise a dispersion of polymers within an aqueous solution, and may be made by known methods of synthesis, or obtained commercially from manufacturers such as Covestro AG, where a suitable mixture of a polycarbonate composite blend is sold under the trade name Bayhydrol A 2846. When incorporated within an aqueous colloidal dispersion as herein contemplated alongside a suitable crosslinking agent such as nano zinc and the aqueous colloidal dispersion is applied to a surface and allowed to cure, it has been found that a superior coating may result. According to the present disclosure, it is contemplated that self-crosslinking hydroxyfunctional polyacrylates may be included within the aqueous colloidal dispersion in an amount ranging up to about 75% of the non-volatile content of the aqueous colloidal dispersion. However, it may be seen that more or no self-crosslinking hydroxyfunctional polyacrylates may be present, without departing from the scope and spirit of the disclosure.

An experimental embodiment of a coating formed as the cured reaction product according to this first exemplary embodiment was manufactured in which about 75% of the non-volatile content of the aqueous colloidal dispersion was formulated to be self-crosslinking hydroxyfunctional polyacrylates, about 25% of the non-volatile content of the aqueous colloidal dispersion was formulated as aliphatic poly(carbonate-ester) polyurethanes, 6% of the volume of the aqueous colloidal dispersion was formulated as NMP, and about 0.1% of the of the non-volatile content of the aqueous colloidal dispersion was formulated as nano zinc. It was found that after application of the aqueous colloidal dispersion to concrete tile at 12 mm thickness, the resulting surface coating dried in 9 minutes and hardened to full hardness in approximately 1 hour. After 24 hours, the surface coating was optically clear and displayed excellent abrasion resistance. Dry times were similar when applied to asphalt, and adhesion was excellent. In addition, when 10% of the aggregate non-volatile content of the aqueous colloidal dispersion was replaced with a grey pigment, the resulting film had a similar appearance except for being a grey color, and was similarly hard and scratch resistant. Pigment levels of up to 25% were tested, and similar resistance properties were maintained at pigment levels at all tested levels.

According to a second exemplary embodiment, a composite coating may be obtained as the cured reaction product of an aqueous colloidal dispersion including a polycarbonate composite blend, a coalescent agent, an alkoxy-functional polysiloxane resin, and a carbodiimide.

Alkoxy-functional polysiloxane resins may comprise a dispersion of polymers within an aqueous solution, and may be made by known methods of synthesis, or obtained commercially from manufacturers such as Dow Chemical Company, where a suitable mixture of Alkoxy-functional polysiloxane resins is sold under the trade name DOWSIL 8017.

Carbodiimides are known in the art as cross-linkers for use with polymers containing carbodiimide segments (—N=C=N—), which are reactive with a number of targets of functional groups such as aldehydes and ketones, among others within the carbonyl functional group. According to certain exemplary embodiments, the carbodiimide used may be a hydrophilically-modified polyfunctional polycarbodiimide. Carbodiimides may be made by known methods of synthesis, or obtained commercially from manufacturers such as Covestro, where a suitable carbodiimide is sold under the trade name Desmodur XP 2802.

An experimental embodiment of a coating formed as the cured reaction product according to this second exemplary embodiment was manufactured in which about 25% of the non-volatile content of the aqueous colloidal dispersion was formulated to be alkoxy-functional polysiloxane resins, about 75% of the non-volatile content of the aqueous colloidal dispersion was formulated as aliphatic poly(carbonate-ester) polyurethanes, 6% of the volume of the aqueous colloidal dispersion was formulated as NMP, and about 5% of the of the non-volatile content of the aqueous colloidal dispersion was formulated to be carbodiimide. It was found that after application of the aqueous colloidal dispersion to a concrete tile at 12 mm thickness, the resulting surface coating dried in 7 minutes and hardened to full hardness in approximately 2 hours. After 24 hours, the surface coating displayed similar hardness as in the experimental coating of the first exemplary embodiment, and further retained all properties even when placed in an oven at 400 F, with no softening, indicating substantial heat resistance. Dry times were similar when applied to asphalt, and adhesion was excellent.

According to a third exemplary embodiment, a composite product may be obtained as the cured reaction product of an aqueous colloidal dispersion including a polycarbonate composite blend, a coalescent agent, a urethane-acrylate hybrid polymer, and metal oxide particles having a mean particle size across all dimensions ranging from 1 to 100 nm.

Urethane-acrylate hybrid polymers may comprise a dispersion of polymers within an aqueous solution, and may be made by known methods of synthesis, or obtained commercially from manufacturers such as Evonik Industries, where a suitable mixture of urethane-acrylate hybrid polymers is sold under the trade name HYBRIDUR 570.

An experimental embodiment of a composite product in the form of a coating formed as the cured reaction product according to this third exemplary embodiment was manufactured in which about 47.5% of the non-volatile content of the aqueous colloidal dispersion was formulated to be urethane-acrylate hybrid polymers, about 47.5% of the non-volatile content of the aqueous colloidal dispersion was formulated as aliphatic poly(carbonate-ester) polyurethanes, 5% of the volume of the aqueous colloidal dispersion was formulated as NMP, and about 5% of the of the non-volatile content of the aqueous colloidal dispersion was formulated to be nano zinc. It was found that the aqueous colloidal dispersion dried in 10 minutes and resulted in a clear coating, and was extremely flexible, and elongated more than 400% before breaking. The aqueous colloidal dispersion was applied at 12 mm thickness to a wood substrate, and the sample could bend 180 degrees without any cracking. Dry times were similar when applied to asphalt, and adhesion was excellent.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A composite product comprising the cured reaction product of an aqueous colloidal dispersion of:
   a polycarbonate composite blend comprising a polycarbonate copolymerized with an aromatic or aliphatic polyurethane;
   a self-crosslinking hydroxyfunctional polyacrylate;
   a coalescent agent; and
   metal oxide particles having a mean particle size across all dimensions ranging from 1 to 100 nm;
   wherein in the aqueous colloidal dispersion, the self-crosslinking hydroxyfunctional polyacrylate is provided in an amount of about 75% of non-volatile content of the aqueous colloidal dispersion.

2. The composite product of claim 1, wherein in the aqueous colloidal dispersion, the polycarbonate composite blend comprises an aliphatic poly(carbonate-ester).

3. The composite product of claim 1, wherein in the aqueous colloidal dispersion, the polycarbonate composite blend is provided in an amount of about 25% of the non-volatile content.

4. The composite product of claim 1, wherein in the aqueous colloidal dispersion, the coalescent agent comprises N-methyl-2-pyrrolidone.

5. The composite product of claim 1, wherein in the aqueous colloidal dispersion, the coalescent agent is provided in an amount from about 2% to about 10% by volume.

6. The composite product of claim 1, wherein in the aqueous colloidal dispersion, the metal oxide particles are provided in an amount from about 0.05 to about 5% of the non-volatile content.

7. The composite product of claim 1, wherein the metal oxide particles comprise zinc oxide.

8. The composite product of claim 1, wherein the aqueous colloidal dispersion further comprises a pigment in an amount of 1% to 20% of the non-volatile content.

* * * * *